(12) United States Patent
Kralik et al.

(10) Patent No.: US 11,460,062 B2
(45) Date of Patent: Oct. 4, 2022

(54) LOCKABLE RELATIVE ROTATION DEVICE

(71) Applicant: Western Technology, Inc., Bremerton, WA (US)

(72) Inventors: Michael Kralik, Draper, UT (US); Lyal Christensen, Bremerton, WA (US)

(73) Assignee: Western Technology, Inc., Bremerton, WA (US)

( * ) Notice: Subject to any disclaimer, the term of this patent is extended or adjusted under 35 U.S.C. 154(b) by 0 days.

(21) Appl. No.: 16/951,383

(22) Filed: Nov. 18, 2020

(65) Prior Publication Data

US 2022/0154749 A1    May 19, 2022

(51) Int. Cl.
     *F16B 7/04*    (2006.01)
(52) U.S. Cl.
     CPC .................................. *F16B 7/048* (2013.01)
(58) Field of Classification Search
     CPC .... F16M 11/048; F16M 11/10; F16M 11/103;
                    F16M 11/121; F16M 11/18;
     (Continued)

(56) References Cited

U.S. PATENT DOCUMENTS

| 3,638,973 A | 2/1972 | Peletti |
| 4,050,661 A * | 9/1977 | Wooldridge ......... G01B 5/0004 248/285.1 |

(Continued)

FOREIGN PATENT DOCUMENTS

WO   WO 2016/124860 A1   8/2016

OTHER PUBLICATIONS

Rozetka.; "AGS Magic Arm Swivel." Retrieved from https://rozetka.com.ua/ua/tripods/c80075/ ; on Feb. 10, 2020; 2 Pages.

*Primary Examiner* — Daniel J Wiley
(74) *Attorney, Agent, or Firm* — Thorpe North and Western LLP

(57) ABSTRACT

A lockable relative rotation device can comprise a first body including an outwardly extending inner flange having a first side, and a first interface feature associated with the first side of the inner flange. The lockable relative rotation device can also comprise a second body operable to rotate relative to the first body about an axis and to translate relative to the first body in first and second directions parallel to the axis. The second body can include an inwardly extending outer flange disposed proximate the first side of the inner flange, and a second interface feature associated with the outer flange. The first and second interface features can be operable to selectively engage and disengage one another upon relative translation of the first and second bodies in the first and second directions, respectively. When the first and second interface features are engaged, the first and second bodies can be maintained in a fixed rotational relationship with one another about the axis and, when the first and second interface features are disengaged, the first and second bodies can be free to rotate relative to one another about the axis. Additionally, the lockable relative rotation device can comprise a locking mechanism associated with the first body. The locking mechanism can have a barrier selectively movable in the first direction to maintain engagement of the first and second interface features, and movable in the second direction to facilitate disengagement of the first and second interface features.

26 Claims, 8 Drawing Sheets

(58) Field of Classification Search
CPC ........... F16C 11/103; Y10T 403/32368; Y10T 403/32049; Y10T 403/32008
See application file for complete search history.

(56) References Cited

U.S. PATENT DOCUMENTS

| | | | | |
|---|---|---|---|---|
| 5,405,347 | A * | 4/1995 | Lee | A61B 17/6416 606/54 |
| 5,547,305 | A * | 8/1996 | Treche | B25B 5/006 403/103 |
| 5,564,852 | A * | 10/1996 | Maxwell | H01R 11/14 403/97 |
| 5,957,421 | A | 9/1999 | Barbour | |
| 5,964,439 | A * | 10/1999 | Johnson | A61G 5/10 248/278.1 |
| 6,079,682 | A * | 6/2000 | Olkkola | B60R 11/0241 248/278.1 |
| 6,093,878 | A * | 7/2000 | Hoshino | G10D 13/063 84/421 |
| 6,582,147 | B1 * | 6/2003 | Pursiheimo | F16M 11/10 403/97 |
| 6,863,252 | B2 | 3/2005 | Bosson | |
| 6,886,852 | B2 * | 5/2005 | Cheng | B62B 1/045 280/47.26 |
| 8,146,879 | B2 * | 4/2012 | Liao | B60R 7/12 248/514 |
| 8,640,998 | B2 | 2/2014 | Lau et al. | |
| 8,936,223 | B1 * | 1/2015 | McGrath | F16C 11/103 248/219.4 |
| 9,121,436 | B2 | 9/2015 | Hahner | |
| 9,791,097 | B2 | 10/2017 | Bowman et al. | |
| 2006/0291951 | A1 * | 12/2006 | Van Zile, III | F16M 13/022 403/97 |
| 2012/0043448 | A1 * | 2/2012 | Liao | A45B 11/00 248/534 |
| 2012/0112022 | A1 | 5/2012 | Cheng | |
| 2013/0189019 | A1 * | 7/2013 | Kotula | F16M 11/048 403/84 |
| 2015/0102187 | A1 * | 4/2015 | Hennessey | F16M 11/10 248/122.1 |
| 2018/0187828 | A1 | 7/2018 | Law et al. | |

* cited by examiner

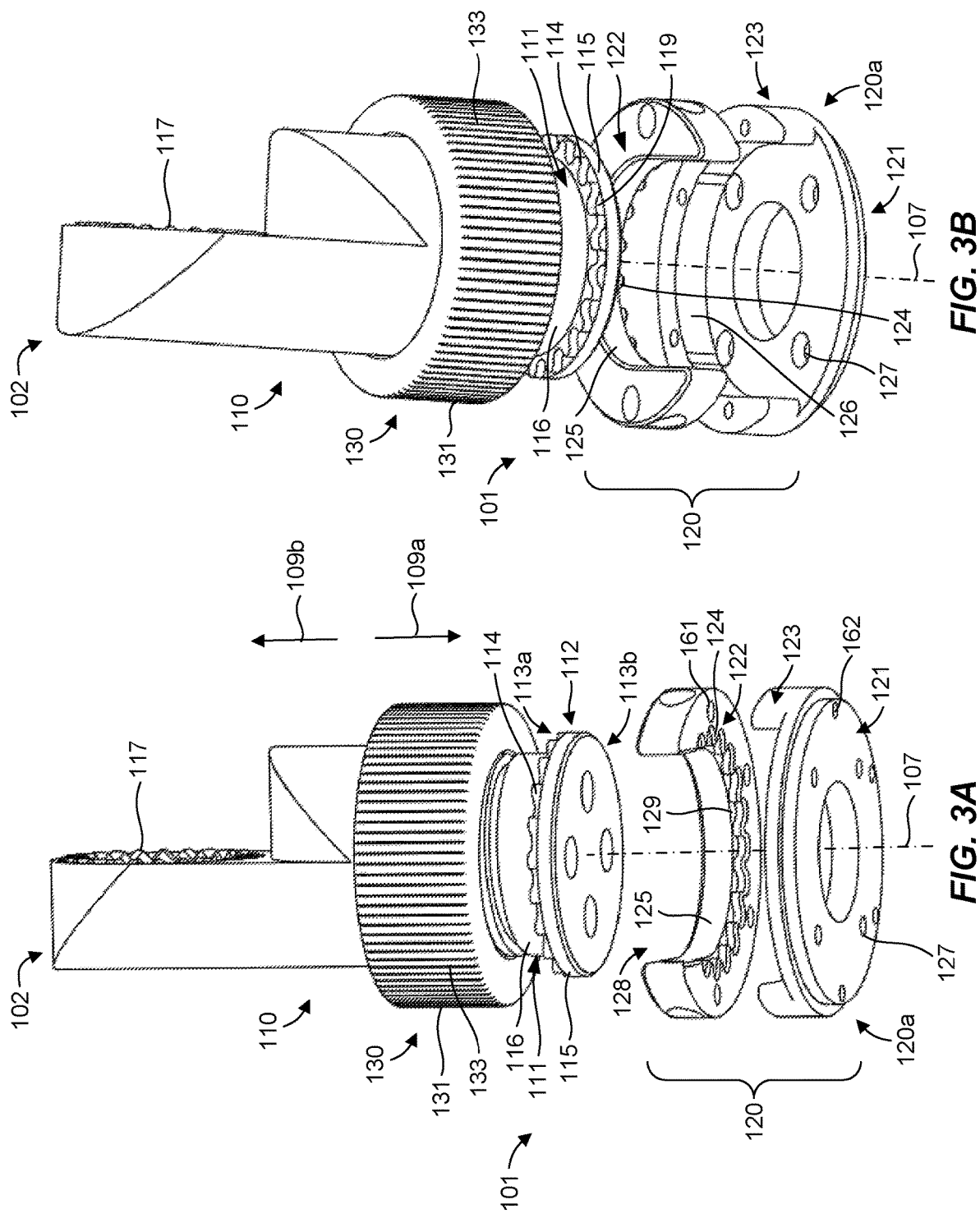

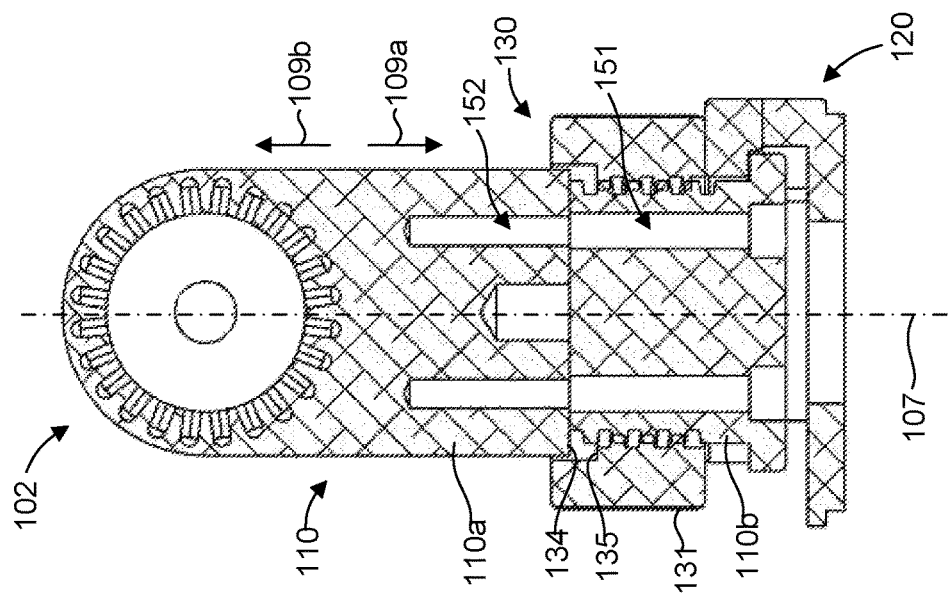
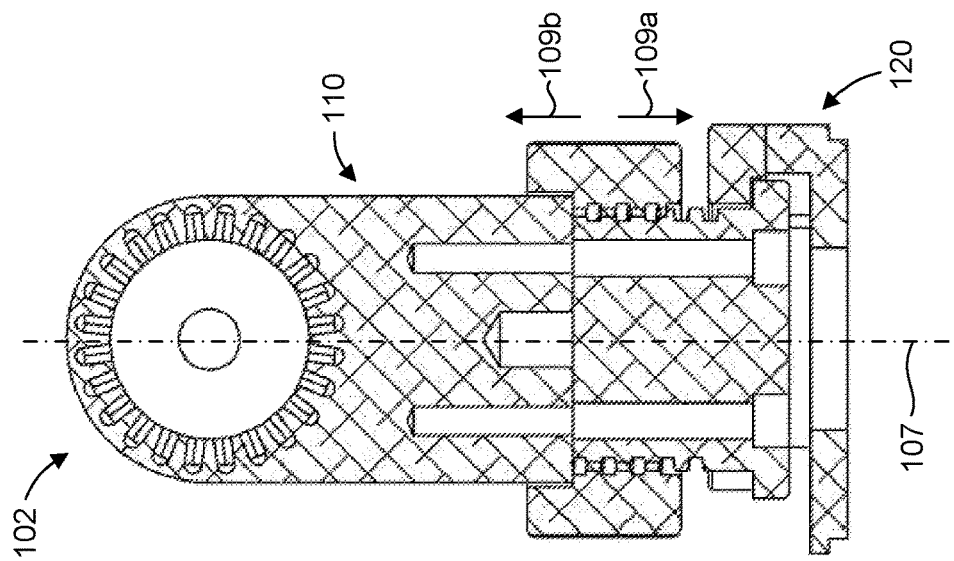
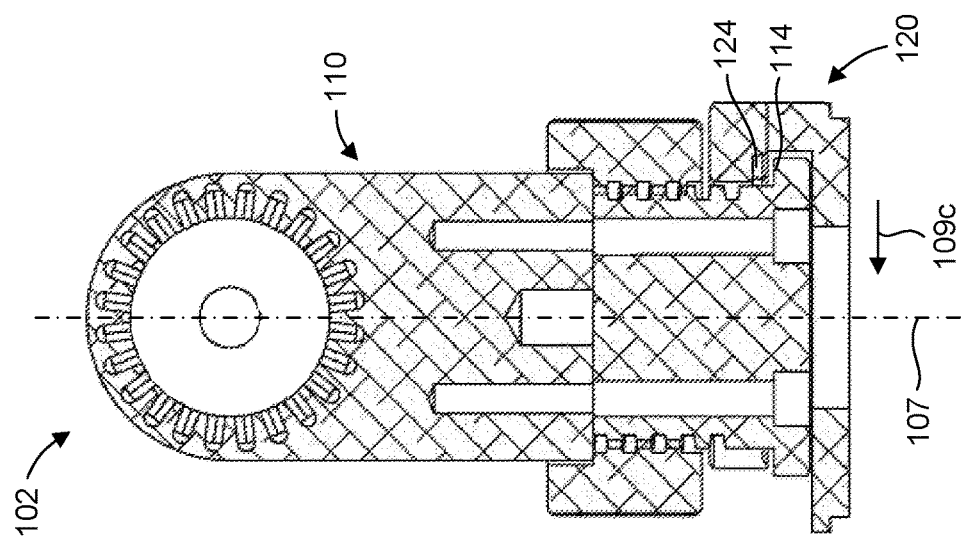

LOCKABLE RELATIVE ROTATION DEVICE

BACKGROUND

It is often desirable to mount one component to another and to have position and/or orientation adjustability. For example, a variety of items (e.g., lights, loudspeakers, antennas, solar panels, sensors, containers, etc.) may be mounted to a support structure (e.g., a wall, a ladder, a pole, a table, a ceiling, a roof, a truss, etc.) where it is beneficial to make a secure and stable position and/or orientation adjustment of the items in order to provide or enhance functionality of the items. It may also be desirable to make quick and easy position and/or orientation adjustments of the items once installed.

SUMMARY

A lockable relative rotation device is disclosed herein that can provide secure and stable position and/or orientation adjustment of an item. In one aspect, the lockable relative rotation device can facilitate quick and easy position and orientation adjustments of the item. The lockable relative rotation device can comprise a first body including an outwardly extending inner flange having a first side, and a first interface feature associated with the first side of the inner flange. The lockable relative rotation device can also comprise a second body operable to rotate relative to the first body about an axis and to translate relative to the first body in first and second directions parallel to the axis. The second body can include an inwardly extending outer flange disposed proximate the first side of the inner flange, and a second interface feature associated with the outer flange. The first and second interface features can be operable to selectively engage and disengage one another upon relative translation of the first and second bodies in the first and second directions, respectively. When the first and second interface features are engaged, the first and second bodies can be maintained in a fixed rotational relationship with one another about the axis and, when the first and second interface features are disengaged, the first and second bodies can be free to rotate relative to one another about the axis. Additionally, the lockable relative rotation device can comprise a locking mechanism associated with the first body. The locking mechanism can have a barrier selectively movable in the first direction to maintain engagement of the first and second interface features, and movable in the second direction to facilitate disengagement of the first and second interface features.

An adjustable attachment orientation joint device is disclosed that can comprise a first arm rotatably coupled to a second arm at a joint. At least one of the first arm or the second arm can include a lockable relative rotation device. The lockable relative rotation device can include a first body including an outwardly extending inner flange having a first side, and a first interface feature associated with the first side of the inner flange. The lockable relative rotation device can also include a second body operable to rotate relative to the first body about an axis and to translate relative to the first body in first and second directions parallel to the axis. The second body can include an inwardly extending outer flange disposed proximate the first side of the inner flange, and a second interface feature associated with the outer flange. The first and second interface features can be operable to selectively engage and disengage one another upon relative translation of the first and second bodies in the first and second directions, respectively. When the first and second interface features are engaged, the first and second bodies can be maintained in a fixed rotational relationship with one another about the axis and, when the first and second interface features are disengaged, the first and second bodies can be free to rotate relative to one another about the axis. In addition, the lockable relative rotation device can include a locking mechanism associated with the first body. The locking mechanism can have a barrier selectively movable in the first direction to maintain engagement of the first and second interface features, and movable in the second direction to facilitate disengagement of the first and second interface features.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIGS. 3A and 3B are exploded views of the arm and lockable relative rotation device of FIGS. 2A and 2B.

FIGS. 5A-5C are side cross-sectional views of the arm and lockable relative rotation device of FIGS. 2A and 2B, showing the lockable relative rotation device in use in accordance with an example of the present disclosure.

Figure 1:
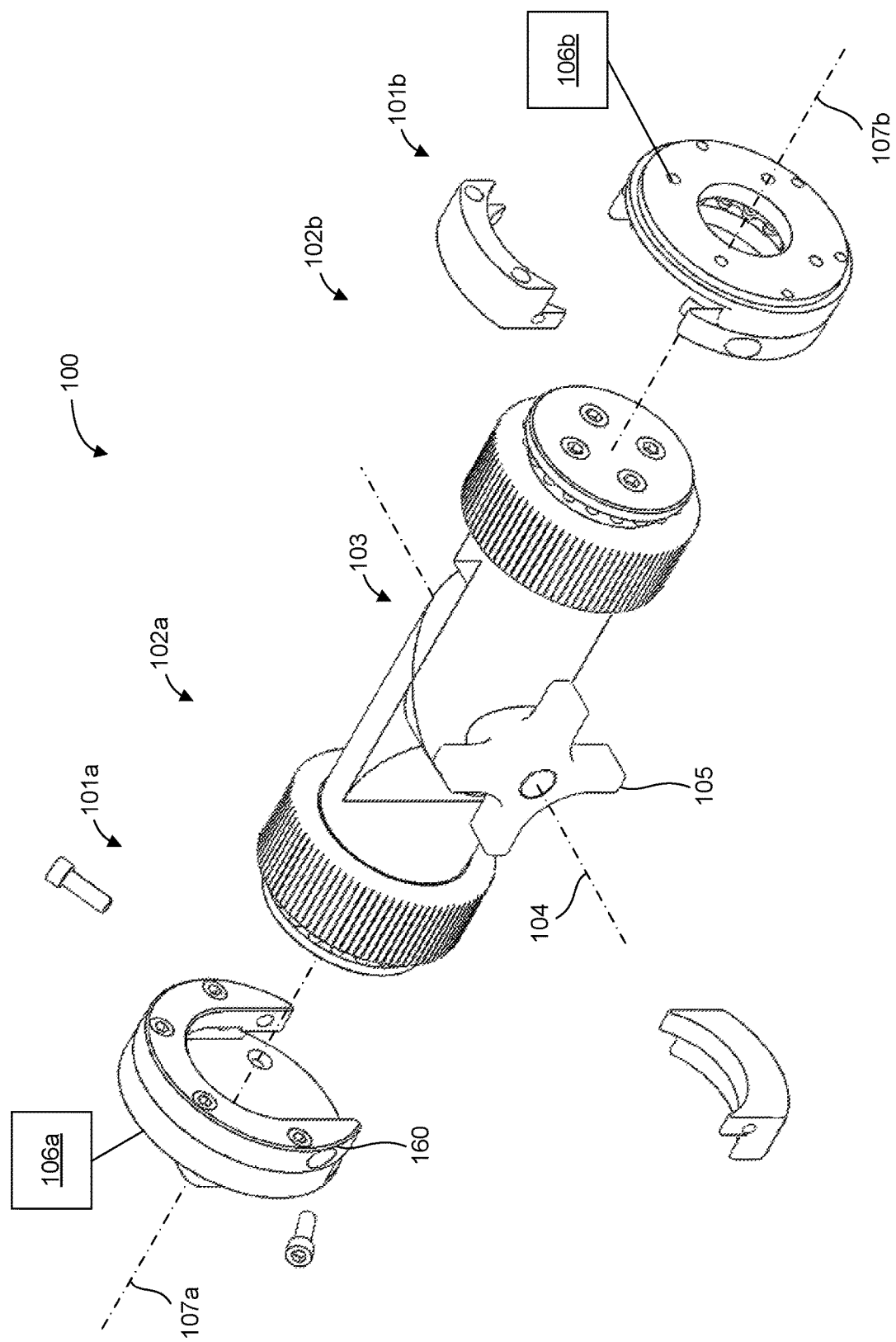
FIG. 1 is a side perspective view of an adjustable attachment orientation joint device in accordance with an example of the present disclosure.
Figure 2B:
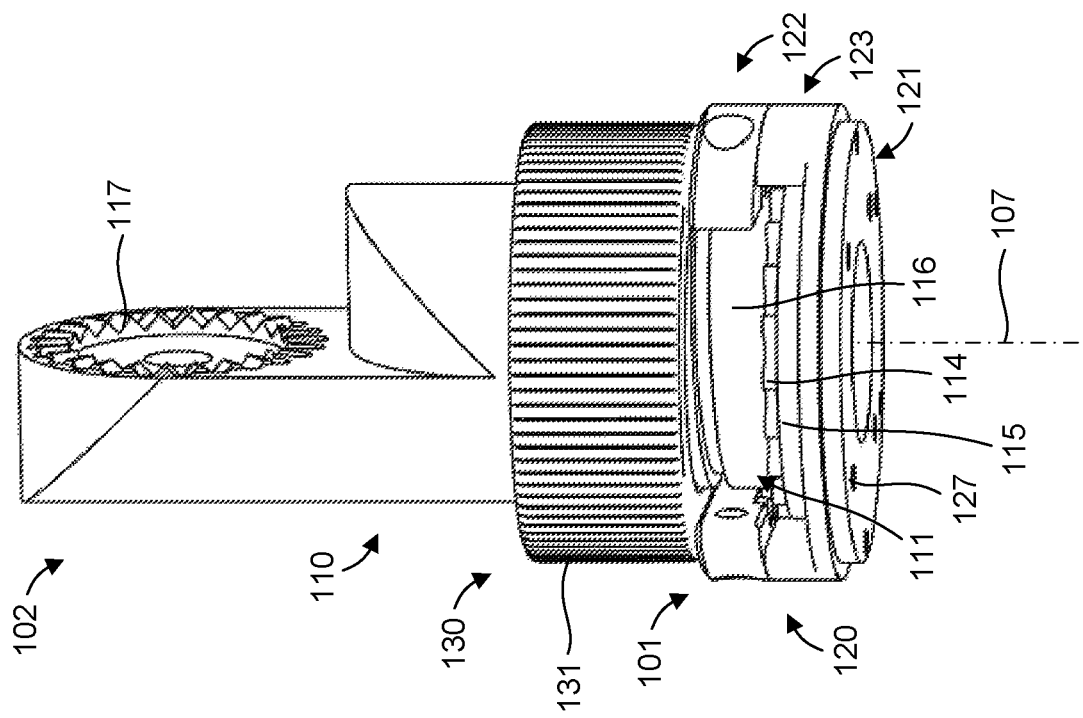
FIGS. 2A and 2B are side perspective views of an arm and lockable relative rotation device of an adjustable attachment orientation joint device in accordance with an example of the present disclosure.
Figure 2A:
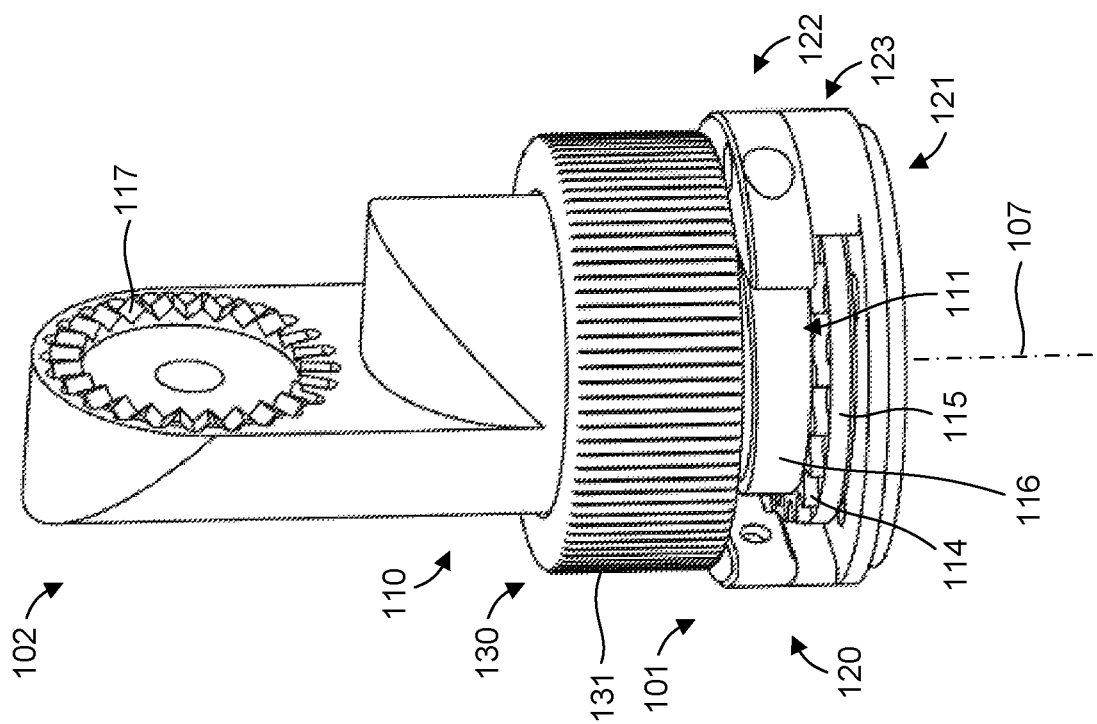
Figure 4:
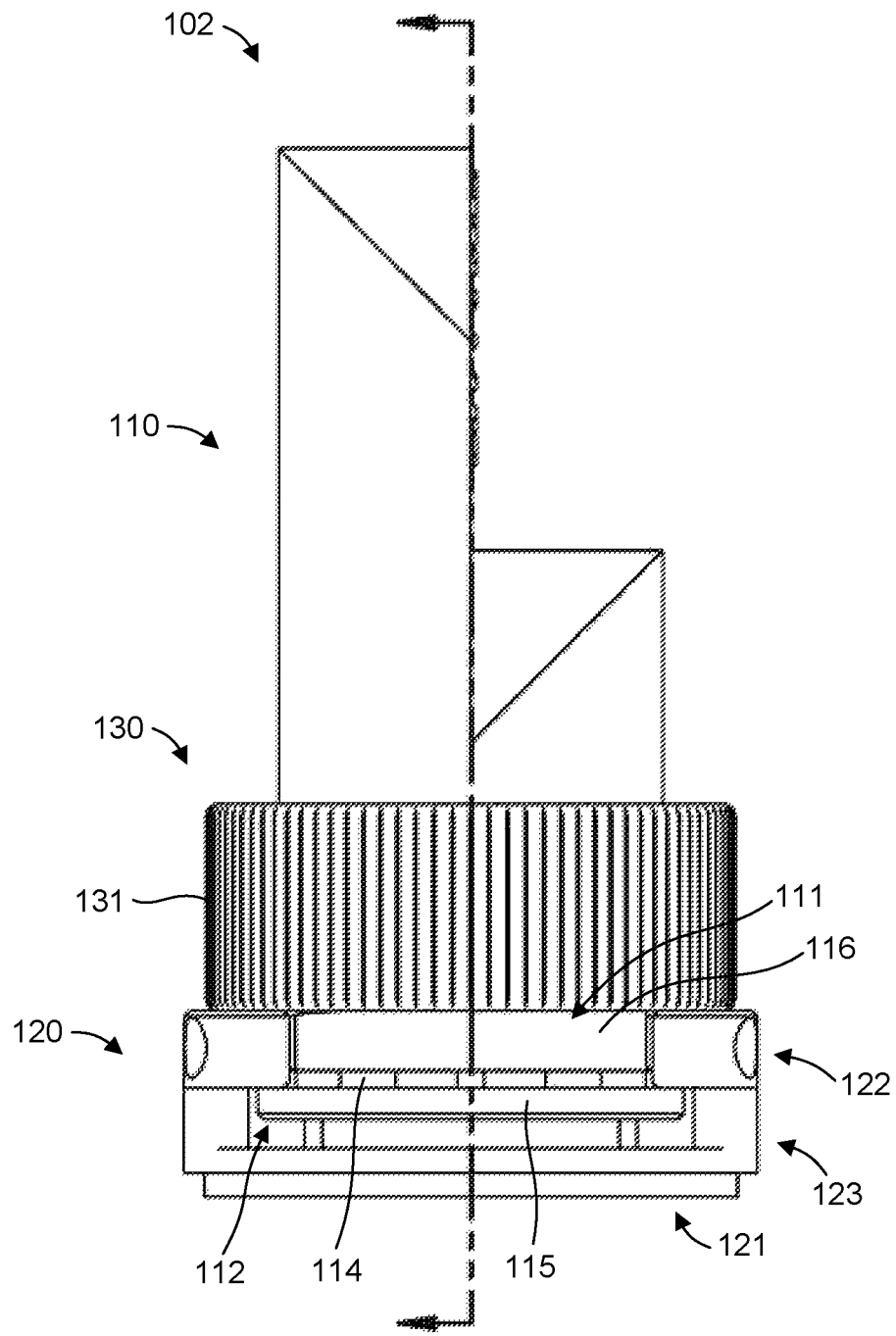
FIG. 4 is a side view of the arm and lockable relative rotation device of FIGS. 2A and 2B.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "an interlocking protrusion" includes reference to one or more of such features and reference to "moving" refers to one or more of such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Lockable Relative Rotation Device

Figure 6:
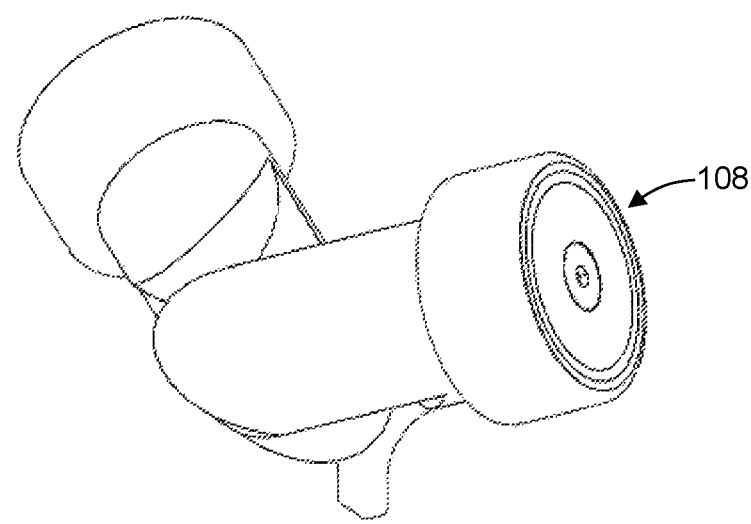
FIG. 6 illustrates an arm of an adjustable attachment orientation joint device with a magnetic coupler in accordance with an example of the present disclosure.

With reference to FIG. 1, an adjustable attachment orientation joint device 100 is illustrated in accordance with an example of the present disclosure. The adjustable attachment orientation joint device 100 can include a first arm 102a rotatably coupled to a second arm 102b at a joint 103 for relative rotation about an axis 104. In one aspect, the adjustable attachment orientation joint device 100 can be operable to resist relative rotation of the first arm 102a and the second arm 102b about the joint 103. For example, a clamping mechanism 105 (e.g., a threaded fastener, such as a thumbscrew) can be included to preload the first and second arms 102a, 102b against one another to resist relative rotation about the joint 103. Ends of the first and second arms 102a, 102b can be configured to be coupled to respective external components 106a, 106b. At least one of the first arm 102a or the second arm 102b can include a lockable relative rotation device 101a, 101b to facilitate selective relative rotation of the external components 106a, 106b about respective axes 107a, 107b. Thus, the external components 106a, 106b can be rotated relative to one another about the axes 104, 107a, 107b (i.e., positioned/oriented in a rotational degree of freedom about each of the axes 104, 107a, 107b) and locked in position to achieve a desired relative orientation and/or position. A representative arm 102 and lockable relative rotation device 101 are illustrated in FIGS. 2A-5C and discussed in more detail below. The external components 106a, 106b can be any suitable components that may be attached or coupled to one another. For example, the external component 106a can be a wall, a ladder, a pole, a table, a ceiling, a roof, a truss, etc. or any other structure that can serve as a base mount or support, and the external component 106b can be a light, a loudspeaker, an antenna, a solar panel, a sensor, a container, etc. or any other device or mechanism that may be supported by and positioned relative to a base mount or support. Although FIG. 1 illustrates a lockable relative rotation device associated with each arm 102a, 102b, it should be recognized that only one arm may include a lockable relative rotation device. In some examples, one arm can include a lockable relative rotation device as disclosed herein, and the other arm can include a magnetic coupler 108 (see FIG. 6) operable to couple with an external component.

With reference to FIGS. 2A-5C, the lockable relative rotation device 101 can include a first body 110 and a second body 120. The first and second bodies 110, 120 can be operable to rotate relative to one another about an axis 107, and to translate relative to one another in directions 109a, 109b parallel to the axis 107. The first body 110 can include a base portion 111 and an outwardly extending inner flange 112 (e.g., extending outwardly from the base portion 111). The inner flange 112 can have a first side 113a and a second side 113b opposite the first side 113a. The first body 110 can also include a first interface feature 114 associated with the first side 113a of the inner flange 112. The first side 113a of the inner flange 112 can be oriented in the direction 109b.

The first body 110 can include a stop surface 119 (FIG. 3B) on the first side 113a of the inner flange 112. In one aspect, due to the orientation of the first interface feature 114, the inner flange 112 can provide support and/or protection for the first interface feature 114 when separated from the second body 120, such as against deformation due to impacts if dropped or mishandled.

The second body 120 can include an inwardly extending outer flange 122 operable to be disposed proximate the first side 113a of the inner flange 112. The second body 120 can also have a second interface feature 124 associated with the outer flange 122. The first and second interface features 114, 124 can be configured to interface with and engage one another as well as disengage one another, as described in more detail below. The second body 120 can include a stop surface 129 (FIG. 3A) on the outer flange 122 operable to interface with the stop surface 119 of the inner flange 112 and provide a stop to translation of the second body 120 in direction 109a relative to the first body 110. In one aspect, the second body 120 can include a backing portion 121 operable to be disposed proximate the second side 113b of the inner flange 112. In another aspect, the second body 120 can include an outer wall 123 operable to be disposed at least partially about an outer peripheral surface 115 of the inner flange 112. In one aspect, an inner surface 125 of the outer flange 122 can be disposed proximate to, and at least partially about, an outer surface 116 of the base portion 111. Thus, various components of the second body 120 (e.g., the outer flange 122, the backing portion 121, and the outer wall 123) can at least partially surround or be disposed about various components of the first body 110 (e.g., the inner flange 112 and the base portion 111). The pairing of an inner surface 126 of the outer wall 123 and the outer peripheral surface 115 of the inner flange 112 and/or the pairing of the inner surface 125 of the outer flange 122 and the outer surface 116 of the base portion 111 can constrain relative motion of the first and second bodies 110, 120 about and along the axis 107 when the first and second interface features 114, 124 are disengaged.

When the first and second interface features 114, 124 are disengaged, the first and second bodies 110, 120 can be free to rotate relative to one another about the axis 107, as illustrated in FIG. 5A. The first and second interface features 114, 124 can selectively engage one another upon translation of the second body 120 in direction 109a relative to the first body 110, as illustrated in FIG. 5B. On the other hand, the first and second interface features 114, 124 can selectively disengage one another upon translation of the second body 120 in direction 109b relative to the first body 110, as illustrated in FIG. 5B, to return to the disengaged configuration shown in FIG. 5A. As shown in the illustrated example, the first and second interface features 114, 124 can comprise interlocking protrusions operable to translate relative to one another in the directions 109a, 109b as well as transfer torque and maintain a fixed angular relationship between the first and second bodies 110, 120 about the axis 107. Thus, when the first and second interface features 114, 124 are engaged, the first and second bodies 110, 120 can be maintained in a fixed rotational relationship with one another about the axis 107.

Figure 7:
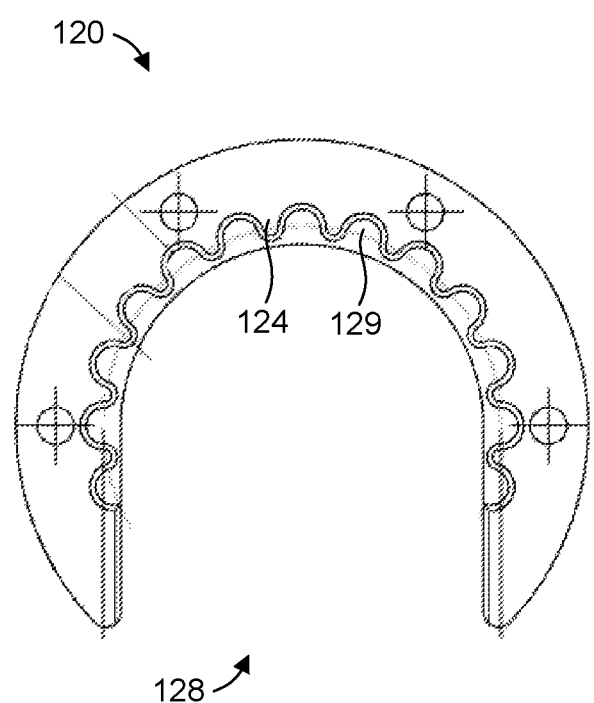
FIG. 7 illustrates interface features of an outer flange of the lockable relative rotation device of FIGS. 2A and 2B in accordance with an example of the present disclosure.
Figure 8:
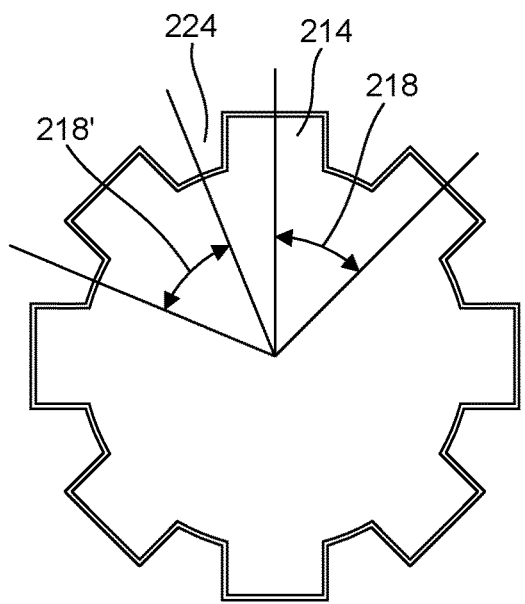
FIG. 8 illustrates external and internal spline interlocking protrusions in accordance with an example of the present disclosure.

The first and second interface features 114, 124 can be or include any suitable type or configuration of interlocking protrusions, such as splines, teeth, ridges, etc. In one aspect, the interlocking protrusions can have a curved profile (see, e.g., an end view of the second interface feature 124 shown in FIG. 7), a linear profile (e.g., a square tooth profile), a curvilinear profile (e.g., an involute tooth profile), etc., as desired. FIG. 8 illustrates exemplary external and internal spline interlocking protrusions 214, 224, respectively. Although a square (e.g., straight, parallel sides) external tooth profile and a complementary internal tooth profile are illustrated, it should be recognized that any suitable type of complementary, mating spline or tooth configuration known in the art (e.g., an involute spline, a crowned spline, a serrated or "V" spline, etc.) is contemplated and can be implemented as complementary interface features in accordance with the present disclosure.

Interlocking protrusions can have any suitable width, depth, or thickness as desired for a given application. For example, the width, depth, and/or thickness of interlocking protrusions can be selected to accommodate a given torque and/or stress to ensure that the interlocking protrusions can function properly for a given application. In one aspect, the first and second interface features 114, 124 can have "coarse" (relatively large, e.g., wide) protrusions or "fine" (relatively small, e.g., narrow) protrusions, as desired for a given application. The size of the protrusions dictates the number of protrusions that can fit around a given circumference. Thus, the larger the protrusions, the fewer protrusions that will fit around a given circumference and the smaller the protrusions, the more protrusions that will fit around a given circumference. With fewer protrusions about a given circumference, the greater the angle between adjacent protrusions and, with more protrusions about a given circumference, the smaller the angle between adjacent protrusions (see, e.g., angles 218, 218' between respective adjacent protrusions 214, 224 in FIG. 8). Thus, relatively large (e.g., coarse) protrusions provide a relatively large incremental angular adjustment and relatively small (e.g., fine) protrusions provide a relatively small incremental angular adjustment. Fine protrusions may be preferred where more precise angular adjustments are desired and/or the lockable relative rotation device will be used in a clean environment. On the other hand, coarse protrusions may be preferred where less precise angular adjustments can be tolerated and/or the lockable relative rotation device will be used in a dirty environment (e.g., an industrial environment, a mining environment, an agricultural environment, a construction environment, etc.) that can introduce debris into the interface feature region, which can interfere with proper interface feature performance.

Figure 9:
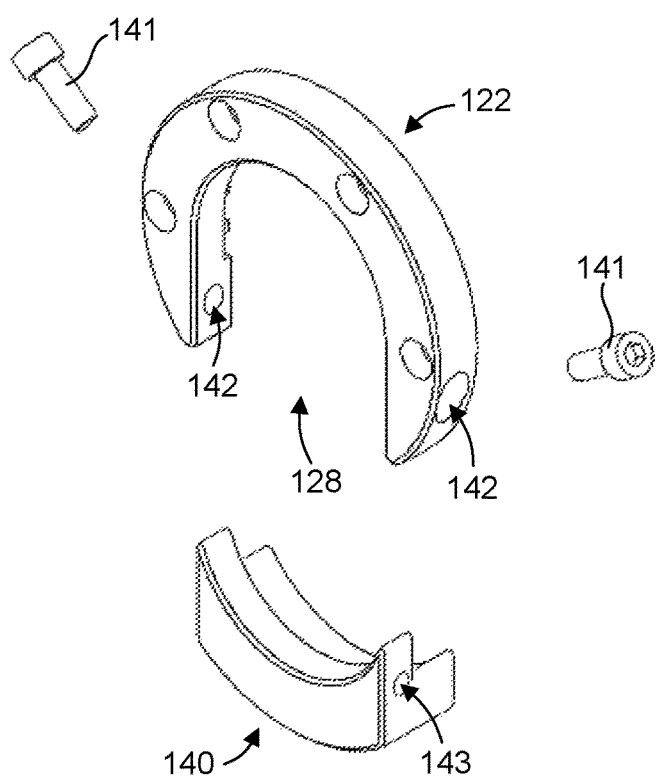
FIG. 9 illustrates a removable capture insert to provide a mechanical barrier to removal of a first body from a second body of the lockable relative rotation device of FIGS. 2A and 2B in accordance with an example of the present disclosure.

With reference to FIG. 9 and further reference to FIGS. 2A-7, the second body 120 can have a lateral opening 128 operable to facilitate coupling and uncoupling the first and second bodies 110, 120 with one another. In one aspect, the lateral opening 128 can be formed in the outer flange 122 and the outer wall 123. The lateral opening 128 can be sized to accommodate the diameter of the inner flange 112 in the outer wall 123 portion of the lateral opening 128, and sized to accommodate the diameter of the base portion 111 in the outer flange 122 portion of the lateral opening 128. The lateral opening 128 can facilitate assembly of the second body 120 with the first body 110 by moving the second body 120 relative to the first body 110 in a lateral direction 109c that is perpendicular to the axis 107 (see FIG. 5A).

In some examples, as illustrated in FIG. 9, the lockable relative rotation device 101 can include a removable capture insert 140 configured to fit within the lateral opening 128 and form a portion of the outer flange 122 and/or the outer wall 123 to prevent separation of the first and second bodies 110, 120 from one another. The removable insert 140 can form a physical or mechanical barrier to removal of the first body 110 from the second body 120 via the lateral opening 128. The removable insert 140 can be secured to the outer flange 122 and/or the outer wall 123 in any suitable manner, such as with one or more fasteners 141 extending through openings 142 (e.g., clearance through-holes) in the removable insert 140 and into openings 143 (e.g., threaded holes) in the outer flange 122.

Referring again to FIGS. 2A-3B, in one aspect, the base portion 111 can have a coupling portion 117 operable to couple with a component. The coupling portion 117 can be located in the direction 109b relative to the interface feature 114. When the first and second bodies 110, 120 are coupled to one another, the coupling portion 117 can be located in the direction 109b relative to the outer flange 122. In the illustrated example, the coupling portion 117 is configured to couple with a similar coupling portion of another arm (e.g., the first and second arms 102a, 102b coupled to one another at the joint 103). The coupling portion 117 can have any suitable configuration known in the art to aid the clamping mechanism 105 in resisting relative rotation about the joint 103, such as mating protrusions as illustrated, to secure a relative angular position of the first and second arms 102a, 102b.

In one aspect, the backing portion 121 can have a coupling portion 127 operable to couple with a component (e.g., the external component 106a or 106b). The coupling portion 127 can be located in the direction 109a relative to the interface feature 124. When the first and second bodies 110, 120 are coupled to one another, the coupling portion 127 can be located in the direction 109b relative to the inner flange 112. The coupling portion 127 can include any suitable structure, device, and/or interface known in the art operable to facilitate coupling the backing portion 121 to an external component, such as an opening, a hole, a stud, etc.

With further reference to FIGS. 2A-5C, in one aspect, the lockable relative rotation device 101 can include a locking mechanism 130 associated with the first body 110. The locking mechanism 130 can have a barrier 131 selectively movable in the first direction 109a to maintain engagement of the first and second interface features 114, 124, as shown in FIG. 5C. For example, the barrier 131 can be positioned relative to the second body 120 sufficient to prevent translation of the second body 120 relative to the first body 110 to maintain engagement of the first and second interface features 114, 124. In addition, the barrier 131 can be movable in the second direction 109b (see FIG. 5B) to facilitate disengagement of the first and second interface features 114, 124, as shown in FIG. 5A. For example, the barrier 131 can be positioned relative to the second body 120 sufficient to allow translation of the second body 120 relative to the first body 110 to facilitate disengagement of the first and second interface features 114, 124. In some examples, the locking mechanism 130 can comprise threaded coupling interfaces 132a, 132b (see FIG. 10) formed in the barrier 131 and the first body 110, respectively, to facilitate selectively moving the barrier 131 in the first and second directions 109a, 109b to alternately maintain engagement and facilitate disengagement of the first and second interface features 114, 124. In one aspect, the barrier 131 can include an exterior interface surface 133 configured to facilitate moving the barrier 131 in the first and second directions 109a, 109b. In some examples, the exterior interface surface 133 can include a grip enhancing feature, such as a texture, knurling, etc. to facilitate gripping the barrier 131 by a user's hand. In some examples, the exterior interface surface 133 can include a tool interface, such as parallel flat surfaces, configured to interface with a tool (e.g., a wrench).

In one aspect, the barrier 131 can maintain the stop surface 129 on the outer flange 122 adjacent to, or in contact with, the stop surface 119 of the inner flange 112 to ensure that the first and second interface features 114, 124 remain engaged. It is not necessary that the stop surfaces 119, 129 be preloaded against one another at all or to any substantial degree in order to maintain a fixed angular position between the first and second bodies 110, 120. This is because maintaining a fixed angular position between the first and second bodies 110, 120 does not rely on such a preload or load path. Instead, the first and second bodies 110, 120 are maintained in a fixed angular position relative to one another by the engagement of the first and second interface features 114, 124, which are configured to transfer torque by their geometry without separating the stop surfaces 119, 129 as a result of the application of such torque. Thus, although the barrier 131 can be preloaded "finger tight" against the second body 120, the barrier 131 can be effective without any preload against the second body 120. For example, the barrier 131 can be positioned close enough to the second body 120 to prevent translation of the second body 120 relative to the first body 110 to the extent that the first and second interface features 114, 124 could become disengaged. In one aspect, the barrier 131 can serve to move the second interface feature 124 in direction 109a into engagement with the first interface feature 114. In other words, lightly tightening the barrier 131 can cause the first and second interface features 114, 124 to become engaged and can ensure that the first and second interface features 114, 124 remain engaged, thereby locking and maintaining the first and second bodies 110, 120 in a fixed angular position relative to one another.

The present technology can therefore enable even heavy masses (e.g., an external component 106a or 106b) to stay firmly oriented without having to rely upon a fastener (e.g., a screw) alone to provide the force necessary to hold the mass (or the first and second bodies 110, 120) in a desired position, as such force is now distributed across the first and second interface features 114, 124. The present technology can rigidly hold an attached component (e.g., an external component 106a or 106b) at the end of the second component 120 in a variety of positions and/or orientations, independent of external forces such as vibration, gravity, impacts, etc. The present technology can also inhibit removal of a connected component (e.g., an external component 106a or 106b), which not only can provide safety during operation, but can also provide a level of security for expensive equipment.

Figure 10:
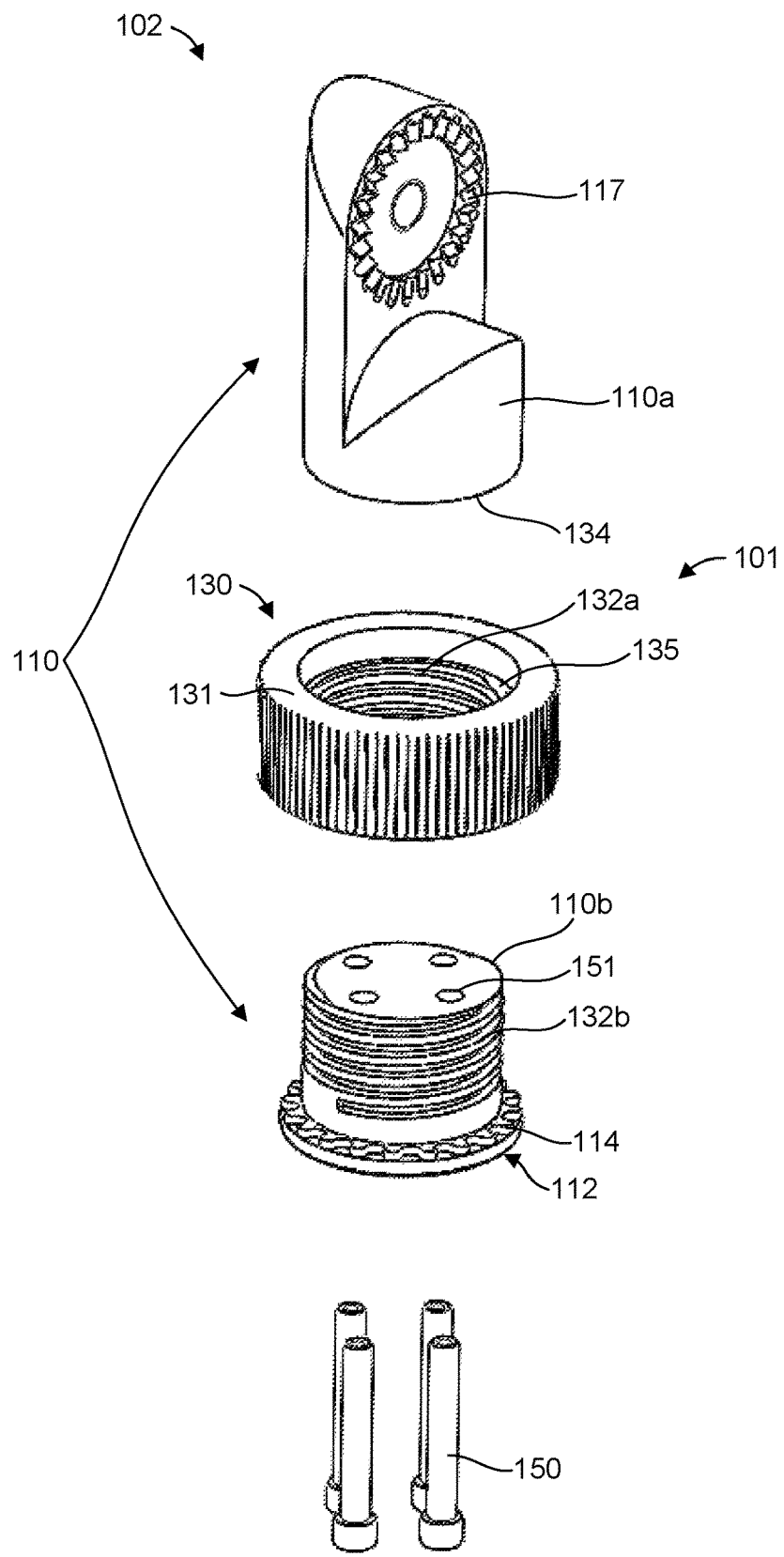
FIG. 10 illustrates a first body and locking mechanism assembly of the lockable relative rotation device of FIGS. 2A and 2B, in accordance with an example of the present disclosure.

FIG. 10 illustrates a first body 110 and locking mechanism 130 assembly, in accordance with an example of the present disclosure. The first body 110 can be formed of a single component or multiple components. In the illustrated example, the first body 110 can include an arm portion 110a and an attachment portion 110b. The arm portion 110a can include the coupling portion 117. The attachment portion 110b can include the inner flange 112, the first interface feature 114, and the threaded coupling interface 132b. The barrier 131 of the locking mechanism 130 can be coupled to the attachment portion 110b via the threaded coupling interfaces 132a, 132b. The attachment portion 110b can be coupled to the arm portion 110a in any suitable manner, such as with one or more fasteners 150 extending through openings 151 (e.g., clearance through-holes) in the attachment portion 110b and into openings 152 (e.g., threaded holes) in the arm portion 110a, as shown in FIGS. 5C and 10 (note that the fasteners 150 have been omitted from FIGS. 5A-5C). In one aspect, the arm portion 110a can have an outer shoulder 134 and the barrier 131 can include an inner shoulder 135. The outer shoulder 134 can be configured to provide a mechanical interference with the inner shoulder 134 to prevent unwanted removal of the barrier 131 from the first body 110.

In one aspect, the second body 120 can be formed of a single component or multiple components. In the example illustrated in FIGS. 3A and 3B, the second body 120 can comprise an end portion 120a including the backing portion 121 and the outer wall 123. The second body 120 can also include the outer flange 122. The end portion 120a can be coupled to the outer flange 122 in any suitable manner, such as with one or more fasteners 160 (FIG. 1) extending through openings 161 (e.g., clearance through-holes) in the outer flange 122 and into openings 162 (e.g., threaded holes) in the end portion 120a.

The various components of the attachment orientation joint device 100 and the lockable relative rotation device 101 disclosed herein can be made of any suitable structural material, such as metals (aluminum, steel, nickel-based alloys, bronze, brass, etc.), polymeric materials (e.g. urethane, nylon, PVC, etc.), composite materials, wood, etc., alone or in any suitable combination. Materials may be selected based on the anticipated operating environment, loading, portability, or any other design concern.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A lockable relative rotation device, comprising:
   a first body including
      an outwardly extending inner flange having a first side, and
      a first interface feature associated with the first side of the inner flange;
   a second body operable to rotate relative to the first body about an axis and to translate relative to the first body in first and second directions parallel to the axis, the second body including
      an inwardly extending outer flange comprising an inner surface that is disposed proximate to and at least partially around an outer surface of the first body, the outer flange being disposed proximate the first side of the inner flange, and
      a second interface feature associated with the outer flange, the first and second interface features being operable to selectively engage and disengage one another upon relative translation of the first and second bodies in the first and second directions, respectively,
      wherein, when the first and second interface features are engaged, the first and second bodies are maintained in a fixed rotational relationship with one another about the axis and, when the first and second interface features are disengaged, the first and second bodies are free to rotate relative to one another about the axis; and
   a locking mechanism associated with the first body, the locking mechanism having a barrier selectively movable in the first direction to maintain engagement of the first and second interface features, and movable in the second direction to facilitate disengagement of the first and second interface features.

2. The lockable relative rotation device of claim 1, wherein the first body comprises a base portion, and the inner flange extends outwardly from the base portion.

3. The lockable relative rotation device of claim 2, wherein the base portion comprises a coupling portion operable to couple with a component.

4. The lockable relative rotation device of claim 3, wherein the coupling portion is located in the second direction relative to the outer flange.

5. The lockable relative rotation device of claim 1, wherein the second body further comprises a backing portion disposed proximate a second side of the inner flange opposite the first side.

6. The lockable relative rotation device of claim 5, wherein the backing portion comprises a coupling portion operable to couple with a component.

7. The lockable relative rotation device of claim 6, wherein the coupling portion is located in the first direction relative to the inner flange.

8. The lockable relative rotation device of claim 1, wherein the second body comprises an outer wall disposed at least partially about an outer peripheral surface of the inner flange.

9. The lockable relative rotation device of claim 1, wherein the first side of the inner flange is oriented in the second direction.

10. The lockable relative rotation device of claim 1, wherein the first and second interface features comprise interlocking protrusions.

11. The lockable relative rotation device of claim 10, wherein the interlocking protrusions comprise splines.

12. The lockable relative rotation device of claim 1, wherein the second body comprises a lateral opening operable to facilitate coupling and uncoupling the first and second bodies with one another.

13. The lockable relative rotation device of claim 12, wherein the lateral opening is formed in the outer flange.

14. The lockable relative rotation device of claim 13, further comprising a removable capture insert configured to fit within the lateral opening and form a portion of the outer flange to provide a mechanical barrier to removal of the first body from the second body via the lateral opening.

15. The lockable relative rotation device of claim 1, wherein the locking mechanism comprises threaded coupling interfaces formed in the barrier and the first body to facilitate selectively moving the barrier in the first and second directions to alternately maintain engagement and facilitate disengagement of the first and second interface features.

16. The lockable relative rotation device of claim 1, wherein the first body further comprises a stop surface associated with the first side of the inner flange.

17. The lockable relative rotation device of claim 1, wherein the inner flange comprises an outer peripheral surface and the second body comprises an outer wall disposed at least partially about the outer peripheral surface of the inner flange.

18. An adjustable attachment orientation joint device, comprising:
   a first arm rotatably coupled to a second arm at a joint, at least one of the first arm or the second arm including a lockable relative rotation device comprising
      a first body including
         an outwardly extending inner flange having a first side, and a first interface feature associated with the first side of the inner flange;

a second body operable to rotate relative to the first body about an axis and to translate relative to the first body in first and second directions parallel to the axis, the second body including an inwardly extending outer flange comprising an inner surface that is disposed proximate to and at least partially around an outer surface of the first body, the outer flange being disposed proximate the first side of the inner flange, and a second interface feature associated with the outer flange, the first and second interface features being operable to selectively engage and disengage one another upon relative translation of the first and second bodies in the first and second directions, respectively, wherein, when the first and second interface features are engaged, the first and second bodies are maintained in a fixed rotational relationship with one another about the axis and, when the first and second interface features are disengaged, the first and second bodies are free to rotate relative to one another about the axis; and a locking mechanism associated with the first body, the locking mechanism having a barrier selectively movable in the first direction to maintain engagement of the first and second interface features, and movable in the second direction to facilitate disengagement of the first and second interface features.

19. The adjustable attachment orientation joint device of claim 18, wherein the second body further comprises a backing portion disposed proximate a second side of the inner flange opposite the first side, the backing portion having a coupling portion operable to couple with a component.

20. The adjustable attachment orientation joint device of claim 18, wherein only the first arm includes the lockable relative rotation device, and the second arm includes a magnetic coupler operable to couple with a component.

21. The adjustable attachment orientation joint device of claim 18, wherein the first arm and the second arm are configured to resist relative rotation about the joint.

22. The adjustable attachment orientation joint device of claim 21, further comprising a clamping mechanism to preload the first and second arms against one another to resist relative rotation about the joint.

23. The adjustable attachment orientation joint device of claim 18, wherein the first and second interface features comprise interlocking protrusions.

24. The adjustable attachment orientation joint device of claim 23, wherein the interlocking protrusions comprise splines.

25. The adjustable attachment orientation joint device of claim 18, wherein the locking mechanism comprises threaded coupling interfaces formed in the barrier and the first body to facilitate selectively moving the barrier in the first and second directions to alternately facilitate disengagement and maintain engagement of the first and second interface features.

26. A lockable relative rotation device, comprising:
a first body including
an outwardly extending inner flange having a first side, and
a first interface feature associated with the first side of the inner flange;
a second body operable to rotate relative to the first body about an axis and to translate relative to the first body in first and second directions parallel to the axis, the second body including
an inwardly extending outer flange disposed proximate the first side of the inner flange,
a second interface feature associated with the outer flange, the first and second interface features being operable to selectively engage and disengage one another upon relative translation of the first and second bodies in the first and second directions, respectively, and
a lateral opening operable to facilitate coupling and uncoupling of the first and second bodies with one another, the lateral opening being formed in the outer flange,
wherein, when the first and second interface features are engaged, the first and second bodies are maintained in a fixed rotational relationship with one another about the axis and, when the first and second interface features are disengaged, the first and second bodies are free to rotate relative to one another about the axis;
a locking mechanism associated with the first body, the locking mechanism having a barrier selectively movable in the first direction to maintain engagement of the first and second interface features, and movable in the second direction to facilitate disengagement of the first and second interface features; and
a removable capture insert configured to fit within the lateral opening and form a portion of the outer flange to provide a mechanical barrier to removal of the first body from the second body via the lateral opening.

* * * * *